US008102313B2

(12) United States Patent
Guenther et al.

(10) Patent No.: US 8,102,313 B2
(45) Date of Patent: Jan. 24, 2012

(54) RETROREFLECTING TRANSPONDER

(75) Inventors: Christoph Guenther, Wessling (DE); Hermann Bischl, Aldersbach (DE); Achim Dreher, Woerthsee (DE)

(73) Assignee: Deutsches Zentrum fuer Luft- und Raumfahrt e.V., (DE)

( * ) Notice: Subject to any disclaimer, the term of this patent is extended or adjusted under 35 U.S.C. 154(b) by 282 days.

(21) Appl. No.: 12/401,210

(22) Filed: Mar. 10, 2009

(65) Prior Publication Data

US 2009/0232188 A1 Sep. 17, 2009

(30) Foreign Application Priority Data

Mar. 11, 2008 (EP) .................................... 08102485

(51) Int. Cl.
*H01Q 3/26* (2006.01)
*H04B 7/185* (2006.01)

(52) U.S. Cl. ...................................... 342/370; 455/13.3

(58) Field of Classification Search .................. 342/370, 342/353, 354; 455/12.1, 13.3, 26.1
See application file for complete search history.

(56) References Cited

U.S. PATENT DOCUMENTS

| | | | | |
|---|---|---|---|---|
| 2,908,002 | A | 10/1959 | Van Atta | |
| 5,257,030 | A | 10/1993 | Aoki et al. | |
| 6,430,392 | B1 * | 8/2002 | Lenormand et al. | 455/12.1 |
| 6,606,058 | B1 | 8/2003 | Bonek et al. | |
| 2002/0072374 | A1 * | 6/2002 | Chang et al. | 455/452 |
| 2005/0030226 | A1 | 2/2005 | Miyamoto et al. | |

OTHER PUBLICATIONS

Shah, R. "Investigation of Retrodirective Array Transponders," Thesis Submission North Carolina State, Nov. 2002, pp. 1-49.*
J.L. Ryerson, "Passive Satellite Communication," Proc. IRE, vol. 48, pp. 613-619, Apr. 1960.
R.C. Hansen, "Communication Satellites Using Arrays," Proc. IRE, vol. 49, pp. 1066-1074, Jun. 1961.
Pucel et al.,"Correction to Communication Satellites Using Arrays," Proc. IRE, vol. 49, pp. 1340-1341, Aug. 1961.
B.S. Hewitt, "The Evolution of Radar Technology into Commercial Systems," IEEE MTT-S Microw. Symp. Dig., 1994, pp. 1271-1274.
K.M.K.H. Leong, R.Y. Miyamoto, T. Itoh, "Moving Forward in Retrodirective Antenna Arrays," IEEE Potentials, pp. 16-21, Aug./Sep. 2003.
E.M. Rutz-Philipp, E. Kramer, "An FM Modulator with Gain for a Space Array," IEEE Trans. Microwave Theory and Techniques, vol. MTT-11, pp. 420-426, Sep. 1963.
S.L. Karode, V.F. Fusco, "Frequency Offset Retrodirective Antenna Array", El. Letters, vol. 33, Jul. 1997.
R.C. Chernoff, "Large Active Retrodirective Arrays for Space Applications," IEEE Trans. Antennas and Propagation, vol. AP-27, pp. 489-496, Mar. 1979.

* cited by examiner

*Primary Examiner* — Gregory C Issing
(74) *Attorney, Agent, or Firm* — Shumaker & Sieffert, P.A.

(57) ABSTRACT

The Method for transmitting a signal from a transmitter in an area around the transmitter via a satellite comprising the steps of transmitting a first signal having a first frequency from the transmitter to a satellite having a retrodirective antenna array comprising receiving antennas and transmitting antennas, receiving the signal transmitted from the transmitter by the receiving antennas of the retrodirective antenna array as first signals wherein the first signals received by the receiving antennas have a phase relation among each other defined by the geometric arrangement of the receiving antennas, and retrodirectively re-transmitting second signals from the transmitting antennas of the antenna array of the satellite in the direction towards the transmitter in the form of a beam with the transmitter located substantially in the center of the beam wherein the second signal has a second frequency different from the first frequency and wherein the phase relations among the second signal transmitted from the transmitting antennas of the antenna array of the satellite are substantially the same as the phase relations among the first signals received by the receiving antennas of the antenna array of the satellite.

9 Claims, 3 Drawing Sheets

RETROREFLECTING TRANSPONDER

Figure 1:
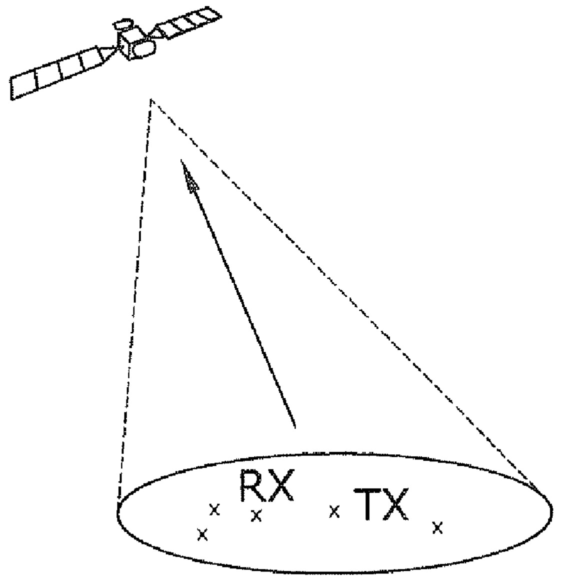

The present invention relates to a retroreflecting transponder and, in particular, to a new scheme for communication satellite payloads. It supports the use of spot beams, and single hop transmission, while staying transparent, i.e. open to an arbitrary choice of modulation, coding, and protocols. The scheme is based on the use of phase conjugation, which allows returning a signal into a spot beam centered around a terrestrial transmitter.

Satellite communication has pioneered a number of areas, including transcontinental telephony, digital TV, digital radio, and high definition TV. It is a primary means for communicating with ships, oil platforms and other remote infrastructures, as well as in disaster recovery and military communications. Last but not least satellite communication is foreseen to play a major role in bridging the digital divide. Most of these very diverse services are based on transparent transponders.

Transparent transponders were the natural approach in the older analog world, and are also extremely successful even with the most advance digital systems. Satellites are costly and have a lifetime of around 15 years. In the last 15 years significant progress has taken place in nearly all areas of communications, including in particular coding and modulation, as well as protocols, and services. Satellite operators are correspondingly keen on keeping the flexibility provided by transparency. New approaches introducing spotbeams, and single hop communication have thus only be adopted in a limited context, e.g., mobile satellite telephony or internet access.

From U.S. Pat. No. 5,257,030 an antenna system for transmitting radio waves in the same direction as the direction of travel of incoming radio waves is known. In this known system, the arrival direction is detected by a fast Fourier transform processor. The transmitting direction is adjusted by phase-shifting radio waves from a feeder on the basis of the detected arrival direction. Accordingly, in this known retroreflecting antenna system, a direction detector is necessary for determining the direction of arrival of incoming radio waves in order to identify the angle of arrival and to control the phase shifters.

The present invention provides a method for transmitting signals from transmitters into areas surrounding those transmitters via a satellite comprising the steps of

- transmitting a first signal having a first frequency from each individual transmitter to a satellite having a retrodirective antenna array comprising receiving antennas and transmitting antennas,
- receiving the signal transmitted from each transmitter by the receiving antennas of the retrodirective antenna array as first signals wherein the first signals received by the receiving antennas have phase relation among each other defined by the geometric arrangement of a particular transmitter and of the receiving antenna array, and
- retrodirectively re-transmitting a second signal using a transmitting antenna array on the satellite in the direction of the particular transmitter considered in the form of a beam centered around the transmitter wherein the second signal has a second frequency different from the first frequency and wherein the phase relations among the second signal transmitted from the transmitting antenna array of the satellite are adjusted in such a manner to return the signal towards the surrounding of the transmitter.

In one embodiment of the present invention there is provided a method for transmitting signals from transmitters into areas surrounding those transmitters via a satellite comprising the steps of

- providing a satellite having a retrodirective antenna array comprising an array of receiving antenna elements and an array of transmitting antenna elements,
- receiving by the receiving antenna elements of the satellite, a plurality of first signals each having a frequency and transmitted from individual transmitters,
- A/D converting the received first signals from analog to digital signals at individual points of time of sampling,
- performing a Fourier transformation to the digital signals from space domain into space spectral domain for each point of time of sampling,
- performing a digital frequency conversion from an uplink frequency band to a downlink frequency band,
- digital phase shifting of the space spectral domain components according to the frequency difference between the uplink and downlink frequency bands by complex multiplication,
- performing an inverse Fourier transformation to phase-shifted space spectral domain components from the space spectral domain to space domain,
- flipping, with respect to the center of the antenna and, in particular, the transmitting antenna element array of the satellite, the order of the transformed signals to be applied to the transmitting antenna elements of the satellite, and
- D/A converting the transformed and flipped signals and applying the converted signals to the transmitting antenna elements of the satellite.

In a preferred embodiment, the distances between transmitting antennas and the distances between receiving antennas are scaled by a factor that substantially corresponds to the ratio of the second frequency to the first frequency.

In alternative embodiment of the present invention, an interelement-spacing of the receiving antenna elements and an interelement-spacing of the transmitting antenna elements are substantially the same, and wherein the phase relation among the first signals received by the receiving antenna elements is transformed into a phase relation among the second signal transmitted from the transmitting antenna elements by performing a fast Fourier transform type of transformation to uncover the individual components, by scaling the argument of the fast Fourier transform, and by constructing the transmitted wave from the scaled fast Fourier transform, including a filtering with respect to a frequency and solid angle argument.

In another embodiment of the present invention the uplink frequency is modified in a pseudorandom manner as frequency hopping wherein uplink frequency hopping in the transmitters is achieved via standard hopping methods (e.g. time-varying local oscillator), and the frequency dehopping is realized in a digital frequency conversion unit of the retrodirective array and/or in digital frequency converting step of the signal processing.

In a further embodiment of the present invention the sequence of frequencies depends on the angle of arrival wherein in a transmitter the uplink frequency hopping sequence can be selected based on the geographical position of the transmitter, which corresponds to a certain angle of arrival, and wherein the frequency dehopping is digitally realized in the retroreflective array depending on the angle of arrival. According to the method as explained above, the digital signals in the space spectral domain correspond implicitly to different angles of arrival.

In a further embodiment of the present invention the array of receiving antenna elements and the array of transmitting antenna elements is realized by one single array of antenna elements capable of being operable as receiving antenna elements and transmitting antenna elements, respectively.

The present invention can be used for distributing information from a number of transmitters towards areas surrounding each of them, e.g. for broadcasting TV and/or radio programs, for creating of joint situation awareness in air-traffic management, for distributing floating car data (FCD), and/or for supporting disaster management, each of this tasks being performed for one or a number of stations in parallel, without any particular configuration of the antenna arrays and their electronics.

According to the present invention it is possible to use the same antenna array elements both for transmitting and receiving signals. The antenna element spacing is independent of the frequency bands used for uplink and downlink frequency hoppings. The method according to the present invention considers implicitly all hypothetical angles of arrival of the different received signals transmitted by the individual transmitters. An explicit identification and determination of the angles of arrival of the different signals transmitted by the transmitters is not necessary in the method according to the invention due to the signal processing as mentioned above. Accordingly, a direction detector and phase shifter elements are not necessary for the method according to the invention. The method according to the invention further supports multiple beams in parallel and the complexity of the method according to the invention does not depend on the number of beams. Furthermore, the method according to the invention allows implicitly the use of frequency hopping sequences to prevent misuse of the retrodirective array.

The present invention addresses an alternative way to combine the advantages of both worlds in a number of applications. The approach is based on the use of retroreflective antennas. Retroreflective antennas send signals back on the same path they came from. The simplest retroreflective device is a corner reflector. Other concepts are based on phase conjugation, which shall be explained in more details in the next section. In reality, the transfer function of the antenna will diffuse the signal over a larger area centered around the transmitter. This applies to ANY transmitter in the coverage area of the satellite and leads to a new option for organizing satellite communication for a number of applications. These applications shall share the property that the recipients of the signals are in the “neighborhood” of the transmitter. Examples of such applications include the broadcasting of regional TV programs; the creation of joint situational awareness in air-traffic management; the distribution of floating car data (FCD); the support of disaster management, and many more. The concept enables an increasingly decentralized approach to such problems. In the case of road information, each vehicle collects the FCD data provided by the satellite and assesses itself the situation, guiding its driver to the intended goal in the safest and fastest possible way.

Figure 2:
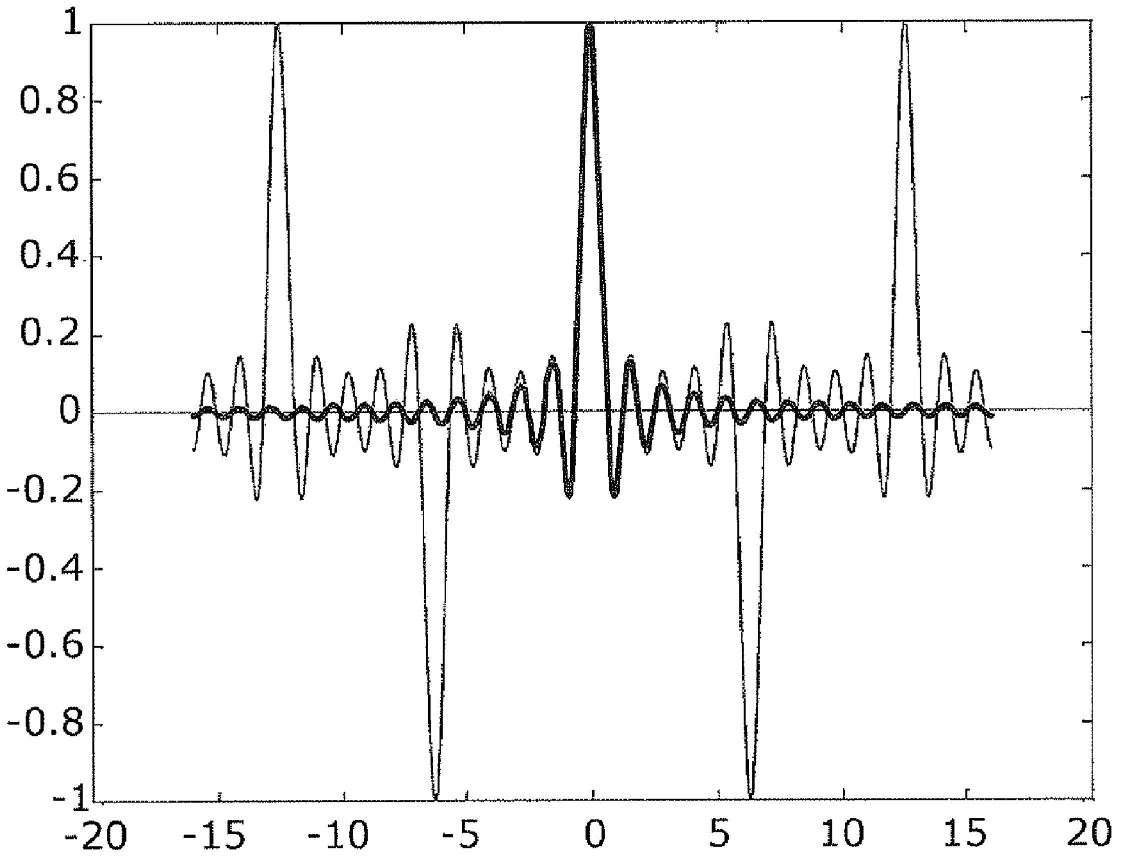
Figure 3:
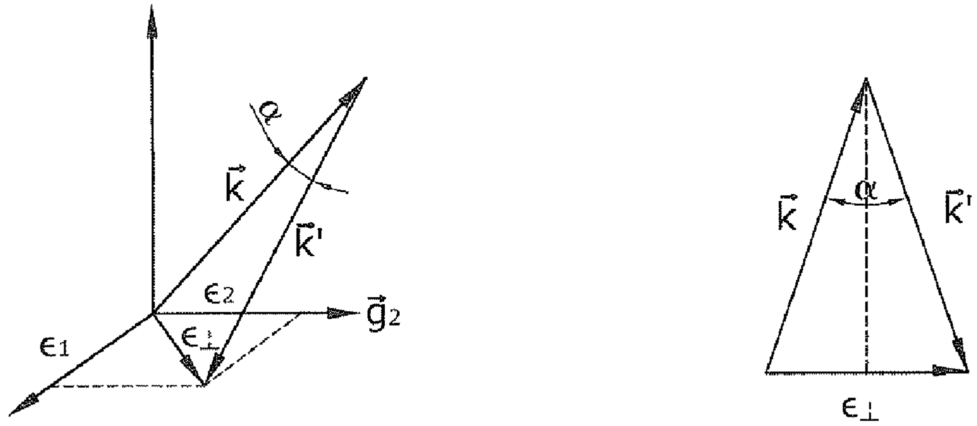
Figure 4:
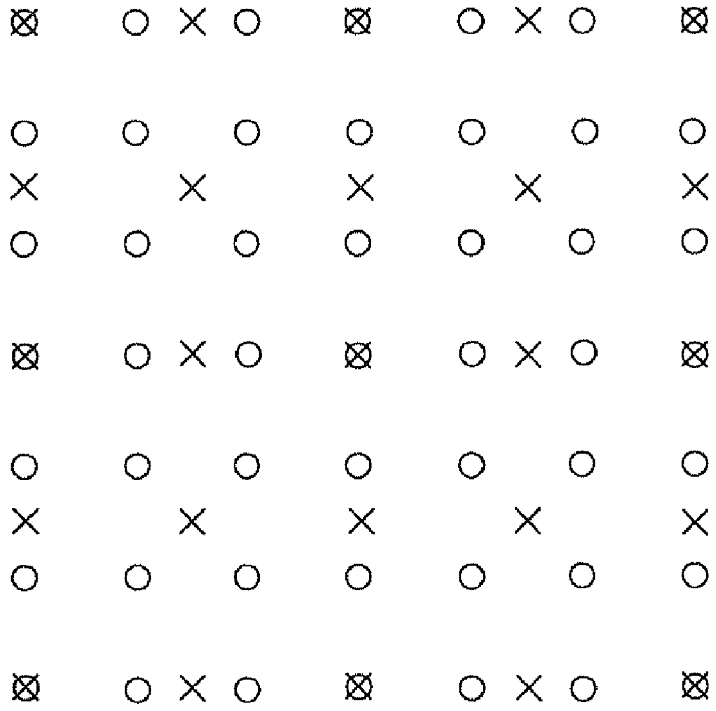
Figure 5:
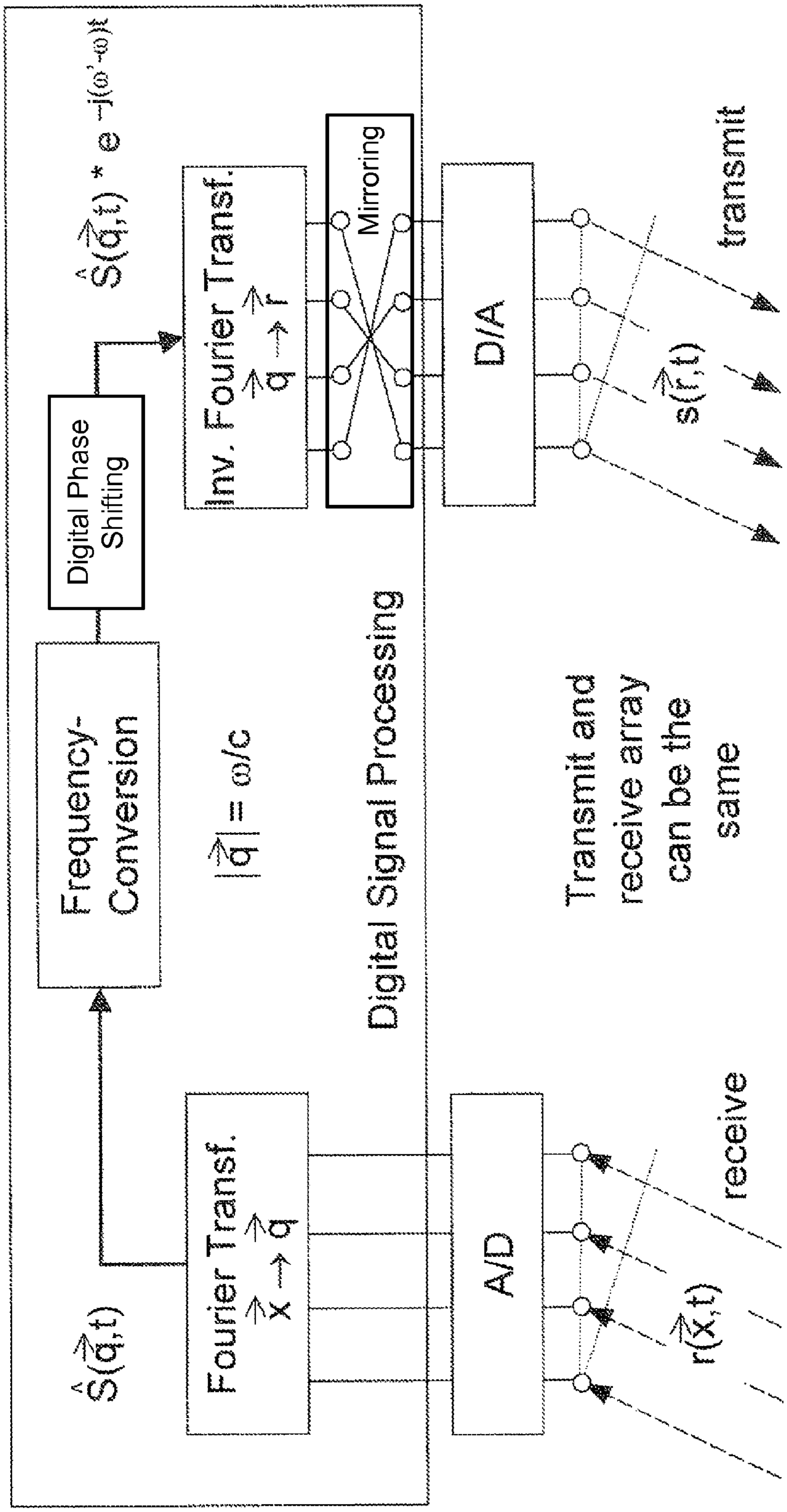

The present invention will be described in more detail referring to the following specification and attached drawing in which FIG. 1 is a illustration of the basic function of a retroreflecting transponder in a satellite for transmitting signals from a transmitter into an area surrounding the transmitter via a satellite, FIG. 2 shows a signal wave form, FIG. 3 shows an illustration of the transfer function of an antenna array, FIG. 4 shows an example of a scaled antenna array, and FIG. 5 shows a diagram depicting the individual steps of signal processing.

The invention will now be described in more detail referring to the following sections wherein Section 1 describes the signals and the array, Section 2 describes a simple conjugation array, Sections 3 and 4 presents a real implementation option, and Section 5, finally, addresses some multiple access aspects.

1. Signal and Array Model

FIG. 1 shows a phase conjugation transponder (satellite) re-transmits the signal into a spot beam centered around the location of the signal originator. The satellite is in the far field of the terrestrial transmitters. It sees a superposition of plane wave components of the form:

$$e^{j(\vec{k}\vec{x}-\omega t)}, \tag{1}$$

with $\vec{x}$ and t being the location and time of the measurement, and with $\vec{k}$ and ω being the wave-vector and the angular frequency of an incident component. Since the propagation is in free space:

$$|\vec{k}| = \frac{\omega}{c}.$$

The direction of $\vec{k}$ points from the source of the electromagnetic radiation towards the satellite. The field resulting from the superposition of the wave-components from all sources can be written in the form:

$$r(\vec{x},t)=\int d^3kS(\vec{k})e^{j(\vec{k}\vec{x}-\omega_m t)}\cdot e^{-j\omega_c t} \tag{2}$$

with $\omega_c$ being the carrier frequency and $\omega_m=c|\vec{k}|-\omega_c$ being the frequency associated with the modulation. The integral is extended over a frequency spectrum that corresponds to the bandwidth of the terrestrial transmitters. The quantity $$c(\vec{x},t)=\int d^3kS(\vec{k})e^{j(\vec{k}\vec{x}-\omega_m t)} \tag{3}$$

describes the spatial and temporal dependency of the signal modulation.

An antenna array samples the incident signal on a finite and discrete grid. Typically, this grid is two dimensional, and we shall assume that it is planar. This is not necessary, however. Different coordinate systems are adequate, depending on the grid geometry. In the case of a rectangular planar grid, Cartesian coordinates are most adequate. For simplicity, we shall assume that the grid spacing and size are the same in both dimensions. If the mutual coupling of the individual antenna elements can be neglected, the antenna array produces the following samples of the field at time t:

$$c(\vec{x}_r + n_1\vec{g}_1 + n_2\vec{g}_2, t), \text{ with } -\frac{N-1}{2} \le n_1, n_2 \le \frac{N-1}{2},$$

with $\vec{x}_r$ denoting the center of the antenna, and $\vec{g}_i$ being vectors that have a length corresponding to the spacing δ and a direction corresponding to the principle axis of the grid.

A similar array as used for the reception is also used for the transmission. The field generated through the excitation of the antenna elements is then subsequently observed in the far field, e.g. on the surface of the earth. The isolated antenna elements are assumed to generate spherical waves in the far field. These spherical waves are best described in spherical coordinates:

$$\frac{e^{jk'|\vec{x}-x_t|}}{|\vec{x}-x_t|}e^{-j\omega_c t},$$

with $\vec{x}$ and $\vec{x}_t$ being the location of the terrestrial receiver and of the satellite transmitting antenna, respectively, and with $k'=\omega_c/c$. The weight of each of these spherical waves is determined by the antenna current. The weight is denoted by $$d(\vec{x}_t+n_1\vec{g}_1+n_2\vec{g}_2,t)$$

and leads to the following expression for the field in the far field location $\vec{x}$:

$$s(\vec{x},t)=\sum_{n_1,n_2} d(\vec{x}_t+n_1\vec{g}_1+n_2\vec{g}_2,t)\frac{e^{j(k'|\vec{x}-(\vec{x}_t+n_1\vec{g}_1+n_2\vec{g}_2)|-\omega_c t)}}{|\vec{x}-(\vec{x}_t+n_1\vec{g}_1+n_2\vec{g}_2)|}. \quad (4)$$

Let $\vec{r}=\vec{x}-\vec{x}_t$ denote the location of the observer in the far field as measured from the antenna center and $\vec{r}=n_1\vec{g}_1+n_2g_2$ be the location of a particular antenna in the same coordinate system, then the distance between the observer and that antenna element can be expanded in the form $$|\vec{r}-\vec{r}|=r-(\vec{e},\vec{r})+\frac{1}{2r}|\vec{e}\wedge\vec{r}|+\ldots$$

with $r=|\vec{r}|$, and $\vec{e}=\vec{r}/r$. The latter unit vector points from the satellite to the receiver. It is the basis for the definition of the wave vector $\vec{k}=k'\vec{e}$, which has the frequency of the signal in the downlink and points in the same direction. This wave vector characterizes the main mode that can propagate from the satellite to a receiver in the location $\vec{x}$. With these comments in mind, the received signal described by Equation (4) can be expressed in the form:

$$s(\vec{x},t)=\frac{e^{j(k'r-\omega_c t)}}{r}\sum_{n_1,n_2} d(n_1\vec{g}_1+n_2\vec{g}_2,t)e^{j\vec{k}(n_1\vec{g}_1+n_2\vec{g}_2)}, \quad (5)$$

for $\vec{x}$ in the far field, i.e., $$\frac{\delta^2}{r\lambda}<<1,\ \frac{\lambda}{r}<<1,\text{ and }\frac{\delta}{r}<<1.$$

2. Conjugation Using an Identical Array

The property of retrodirective reflection is obtained if the relative sign of $\vec{k}\vec{x}$ and of $\omega t$ in Equation (1) is reversed. This can be achieved, by inverting the sign of the first or second term. The first possibility is implemented by an van Atta array [1]. In our notations, this corresponds to the exchange of the signals on antipodal antenna elements $$d(\vec{r})=c(-\vec{r}) \quad (6)$$

and by using the same receive and transmit array. Note that the bandwidth of the signal amplification chain on the satellite is assumed to be matched to the terrestrial transmitters. This setup is mathematically simple. It has been considered in the context of satellite applications [2], [3], as well as RF-IDs, see [4], [5].

The second possibility is to invert the sign of the second term. This is practically implemented by mixing with a local reference carrier at twice the frequency, which results in a term at the threefold carrier and at the negative carrier frequency. This scheme was proposed by [6]. All these schemes share the property of receiving and transmitting on the same or nearly the same frequency, which is not very realistic in a satellite context with separation requirements well beyond 100 dB. More realistic scenarios with frequency transposition will correspondingly be considered in the next section.

In a real antenna array, one might slightly modify the van Atta condition from Equation (6) into $$d\vec{r})=c(-\vec{r})\alpha(\vec{r}),$$

with $\alpha(\vec{r})$ being a weighting function to suppress sidelobes. The choice of $\alpha$ is a compromise between the width of the main lobe and the suppression of the sidelobes. With these comments, the signal returned from a phase conjugating amplifier, observed in the asymptotic position $\vec{x}$, becomes $$s(\vec{x},t)=\frac{e^{j(k'|\vec{r}|-\omega_c t)}}{|\vec{r}|}\sum_{n_1,n_2} c(-n_1\vec{g}_1-n_2\vec{g}_2,t)e^{j\vec{k}'(n_1\vec{g}_1+n_2\vec{g}_2)}.$$

The definition of $c(\vec{x},t)$ from Equation (3) is used for evaluating this expression:

$$s(\vec{x},t)=\frac{e^{j(k'|\vec{r}|-\omega_c t)}}{|\vec{r}|}\int d^3kS(\vec{k})e^{-j\omega_m t}G(\vec{k}'-\vec{k}) \quad (7)$$

with G(•) denoting the transfer function of the array:

$$G(\vec{q})=\sum_{n_1,n_2} e^{j\vec{q}(n_1\vec{g}_1+n_2\vec{g}_2)}\alpha(n_1\vec{g}_1+n_2\vec{g}_2).$$

In the case $\alpha=1$, this can be evaluated in closed form:

$$G(\vec{q})=\frac{\sin\frac{N}{2}\vec{q}\vec{g}_1}{\sin\frac{1}{2}\vec{q}\vec{g}_1}\cdot\frac{\sin\frac{N}{2}\vec{q}\vec{g}_2}{\sin\frac{1}{2}\vec{q}\vec{g}_2}.$$

One quotient of sine functions in the last expression is plotted in FIG. 2 which shows 4 periods of the function $\sin N\epsilon_i/2/(N\sin\epsilon_i/2)$ as thin line and of a tampered version, with $\alpha(\bullet)$ being a Gaussian with $\sigma=N/4$ in thick line (N=10). Aliasing must be prevented by a minimal separation of the antenna elements. Define $\kappa_i=(\vec{k}'-\vec{k})\vec{g}_i$, then the identity $$\lim_{\alpha\to 2\pi\gamma}\frac{\sin N\kappa_i/2}{\sin\kappa_i/2}=N(-1)^{(N-1)\gamma},\text{ with }\gamma\in Z$$

implies that there is aliasing if $\kappa_i/2$ becomes comparable to $\pi$. Therefore, it is meaningful to limit $\kappa_i/2$ to $\pi/2$. This is achieved by choosing $\delta=\lambda/2$, i.e. by spacing the antenna elements by half the wave length of the carrier signal.

The link budget for the satellite-to-ground link requires that $|s(\vec{x},t)|\sim N^2$, i.e. fully exploits the gain generated by the full surface of the antenna.

Now consider a component associated with the wave vector $\vec{k}$. The constraint that the quotient of sines be larger than $1/\sqrt{2}$ (−3 dB in power) implies that c.a. $N\epsilon_i/2<\pi/4$, i.e., $$\left|(\vec{k}' - \vec{k})\vec{g}_i\right| < \frac{\pi}{2N}.$$

Let $\epsilon_i=\kappa_i/\delta$ be the component of $\vec{k}-\vec{k}'$ as projected onto the grid vectors, then $$|\varepsilon_i| \leq \frac{\pi}{2N\delta}.$$

This limits the component of the error in the plane of the antenna to:

$$\varepsilon_\perp = \sqrt{\varepsilon_1^2+\varepsilon_2^2} \leq \frac{\pi}{\sqrt{2}\,N\delta}.$$

The component with the wave-vector $\vec{k}$ furthermore has the frequency $\omega_c+\omega_m$. According to Equation (7), this is also the frequency associated with $\vec{k}$, i.e. $|\vec{k}'|=|\vec{k}|$. This constrains the difference in three dimensions. Either the third component (orthogonal to $\vec{g}_i$) is nearly the same or nearly opposite. With the definitions chosen, the reflected component corresponds to the former case. As mentioned already, the other solution is suppressed by the antenna design. The geometry of the wave-vectors is shown in FIG. 3. The transfer function of the array constrains the error component $\epsilon_\perp$. Together with the equal length condition $|\vec{k}'|=|\vec{k}|$, this limits the difference in angle between the two vectors. From the right drawing, which shows the plane spanned by the transmitter, the satellite, and the receiver, one concludes that the 3 dB aperture $\alpha$ of the beam is given by $$\tan\alpha = \frac{\varepsilon_\perp}{2|\vec{k}|} = \frac{1}{2\sqrt{2}\,N}.$$

This implies the following diameter of the spotbeam (3 dB beam width) in the satellite's nadir $$2h\tan\alpha = \frac{h}{\sqrt{2}\,N},$$

with h being the height of the orbit. An array with 10×10 antennas in a LEO orbit (1000 km), thus leads to a spotbeam size of 140 km. An L-Band antenna with this number of elements, would have a size of 2 meters. Both numbers are quite reasonable. In a GEO orbit the size of the spotbeam would be 36 times larger. Correspondingly, one would typically use a reflector to generate a convergence in the transmit direction and thus a divergence in the receive direction.

3. Conjugation Using a Scaled Array

The previous section has introduced the basic concept of phase conjugation. The mathematics was somewhat simplified by the assumption that the transmit and receive frequencies are identical. A real satellite always needs to keep these two signal well separated, which is typically implemented by frequency division duplexing, i.e. the received signal is translated in frequency before being retransmitted (transponder). In this case, the receive frequency $\omega_c$ is shifted to the transmit frequency $\omega_c$ in a mixer. Such a frequency translation leads to a mispointing as noted by several authors. A short accounting of its impact is found in [7]. Chernoff [8] develops an analog processing method for adapting the phases so that the frequency shifted signal is returned into the direction of the source. His method is based on the estimation of the phase of the incoming signal and on scaling these phases accordingly. Besides the need for a careful consideration of the signal-to-noise ratio in such a setting, the method is also limited to retroflecting the signal from a single source. It is therefore not appropriate in the current multi-source scenario.

In the notations of the previous section, the incoming wave vector k must be scaled in the same manner as the frequency, while simultaneously keeping the direction:

$$\vec{k}' = \frac{\omega_c}{\omega_c}\vec{k}.$$

A conceptually simple approach for scaling the wave vector is to scale the spacing of the array. The transmitted signal then becomes:

$$s(\vec{x}, t) = \frac{e^{j(k'|\vec{x}|-\omega_c t)}}{|\vec{x}|}\sum_{n_1,n_2} c(-n_1\vec{g}_1 - n_2\vec{g}_2, t)e^{j(\omega_c-\omega_c)t}\, e^{j\vec{k}'\frac{\omega_c}{\omega_c}(n_1\vec{g}_1+n_2\vec{g}_2)} = \frac{e^{j(k'|\vec{r}|-\omega_c t)}}{|\vec{r}|}\int d^3 k S(\vec{k})e^{-j\omega_m t}G\left(\frac{\omega_c}{\omega_c}\vec{k}' - \vec{k}\right).$$

This result is interpreted in the same manner as for the identical array. The scheme has the interesting property of being realizable using simple analog hardware components only. For some scale factors, one might even reuse the same elements in the array, see FIG. 4 which shows an example of scaled array that reuses some of the antenna elements in the receive and transmit direction. The ratio of the frequencies is 1.5. In the current approach, the duplex separation between the transmit and receive frequency $\omega_c-\omega_c$ needs to be the same for all users. The ratio of the transmit and received frequencies is geometrically encoded into the array. On the other hand, the capabilities of this approach are only limited by the satellite power and the dynamics of the analog components.

4. Conjugation by Fourier Transform

A more flexible approach—which in particular allows to fully re-use the array for reception and transmission—is obtained by considering the Fourier transform of the signal. To that purpose, the incoming signal is sampled by the antenna, weighted by the tampering function α(•) and Fourier transformed:

$$\hat{S}(\vec{q}, t) = \sum_{n_1, n_2} r(n_1\vec{g}_1 + n_2\vec{g}_2, t)e^{j\vec{q}(n_1\vec{g}_1 + n_2\vec{g}_2)}.$$

This expression is an estimate of the spectral content of the received signal. Its directional part uncovers the components coming from the individual sources. This is essential for the transposition of all signals to the new frequency. Substituting the received signal from Equation (2) leads to:

$$\hat{S}(\vec{q}, t) = \int d^3k S(\vec{k})G(\vec{k} - \vec{q})e^{-j\omega t}, \tag{8}$$

with G(•) being the transfer function of the receive array. If the receive array was capable of perfectly representing the signal, i.e. if $G(\vec{k} - \vec{q}) = \delta(\vec{k} - \vec{q})$, one would obtain $$\hat{S}(\vec{q}, t) = S(\vec{q})e^{-j\omega t}.$$

The estimate is now frequency translated, associated with the wave-vector $$\vec{q} = \frac{\omega_c}{\omega_c}\vec{q},$$

to generate weights for the transmit signal:

$$d(\vec{r}, t) = \int d^3q e^{-j(\omega_c - \omega_c)t}\hat{S}(\vec{q}, t)e^{j\vec{q}\vec{r}}H(\vec{q}, t).$$

This expression, additionally contains a spatial filter H, which is introduced to allow for the description of satellite filters. Such filters will also play a role in an access control scheme described in the next section. The weights are then used in a conjugate setting in Equation (4) and (5) to obtain:

$$\begin{aligned} s(\vec{r}, t) &= \frac{e^{j(k'|\vec{r}| - \omega_c t)}}{|\vec{r}|} \sum_{n_1, n_2} \alpha(n_1\vec{g}_1 + n_2\vec{g}_2)d(-n_1\vec{g}_1 - n_2\vec{g}_2, t) \\ &\quad e^{j\vec{k}(n_1\vec{g}_1 + n_2\vec{g}_2)} \\ &= \frac{e^{j(k'|\vec{r}| - \omega_c t)}}{|\vec{r}|} \int d^3q \int d^3k e^{-j\omega_m t} S(\vec{k})G(\vec{k} - \vec{q})H(\vec{q}, t) \cdot \\ &\quad \sum_{n_1, n_2} \alpha(n_1\vec{g}_1 + n_2\vec{g}_2)e^{j(\vec{k}' - \vec{q})(n_1\vec{g}_1 + n_2\vec{g}_2)} \\ &= \frac{e^{j(k'|\vec{r}| - \omega_c t)}}{|\vec{r}|} \int d^3q \int d^3k e^{-j\omega_m t} S(\vec{k}) \\ &\quad G(\vec{k} - \vec{q})H(\vec{q}, t)G(\vec{k}' - \vec{q}). \end{aligned} \tag{9}$$

The last term in this equation, describes the transformation of the signal by the transfer function of the array. Remember that the receive and transmit transfer functions of the array have their maxima at $\vec{q} = \vec{k}$ and $\vec{k}' = \vec{q}$, respectively, and thus again lead to return beams centered around the transmitters.

An important difference between the schemes described in this and in the preceding section is that the processing via Fourier transform is performed on sampled representations of the signal. This implies that the dynamics of the signal is limited by two additional factors: the dynamics of the analog digital converters, and the width of the words used in Fourier processing. The sampling of the angular domain is typically matched to the resolution of the array, while the sampling in the frequency domain is controlled by the duration of the blocks considered for the transformation. Both limitations are not considered critical.

The main benefit of the conjugation by Fourier transform is that the same physical array can be used for reception and transmission, and that it provides a high level of flexibility for accommodating special requirements of the system under consideration. It is for example possible to create beams of different widths for the distribution of regional and more global information. It is also possible to copy some channels towards a control center, as may be necessary in the context of air traffic management, for example.

5. Access Scheme

The description of the retroreflective transponder, given so far, does not limit the access to the satellite—this is actually the same as for classical satellite transponders. The link budget of the uplink feeds of classical transponders, however, allocates most of the antenna gain to the terrestrial gateway. Therefore, the misuse of such transponders, and their jamming require an antenna of substantial size. In the case of regional TV programs, the present system would be configured in a similar manner. In the case of other applications, such as the dissemination of road information (FCD), the end-user would up-link information himself. Correspondingly, it is wise to include some access mechanisms.

The simplest access mechanism is obtained by frequency hopping. In this case, the filter H in Equation (9) is chosen to block signals from most direction but a few at a time. Assume that at time t the frequency $\omega(\vec{e}, t)$ is allocated to the direction $$\vec{e} = (\cos\phi\sin\theta, \sin\phi\sin\theta, \cos\theta),$$

then the filter is defined by $$H(\vec{q}) = \begin{cases} 1 & \text{if } |\vec{q}| = \dfrac{\omega(\vec{e}, t)}{c} \text{ and } \vec{q} \in C(\vec{e}), \\ 0 & \text{otherwise,} \end{cases}$$

with $C(\vec{e})$ being a conus centered around $\vec{e}$. The size of the conus is chosen to be congruent with the angular resolution of the array. An authorized transmitter has correspondingly to determine $\vec{e}$ and to choose the appropriate frequency, in order to successfully use the transponder. The satellite transmit frequency in the downlink might be unique or might follow the uplink hopping pattern. Both options are possible. The former choice has the advantage, that the terrestrial receivers do not need to be aware of the hopping pattern for receiving the information. Furthermore, the hoping pattern is not disclosed as widely.

The mapping $\omega(\vec{e}, t)$ will typically be chosen to be unique for one service. Several services from a single geographical region may exist in parallel, however. Obviously, the number of allocations can vary as a function of the direction, and thus follow the density of service requests from that direction.

The main signal processing steps of the method according to the present invention are illustrated in FIG. 5.

CONCLUSION

Phase conjugation provides an attractive extension of today's transparent transponder concept. It maintains transparency and combines it with spot beam and single hop transmission. Phase conjugation can be implemented in different ways. A pure hardware implementation seems optimal with respect to transmission efficiency. It typically requires separate receive and transmit antennas on the satellite, however, and encodes the duplex separation into the design of the array.

An alternative scheme, involves signal processing. It provides a high level of flexibility and supports the introduction of access control mechanisms. Potential limitations due to signal processing capabilities are decreasing from year to year due to Moore's law. Apart from these potential limitations, the alternative scheme is as transparent as the first one.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

REFERENCES

[1] L. C. van Atta, "Electromagnetic Reflector," U.S. Pat. No. 2,908,002, Oct. 6, 1959.

[2] J. L. Ryerson, "Passive Satellite Communication," *Proc. IRE*, vol. 48, pp. 613-619, April 1960.

[3] R. C. Hansen, "Communication Satellites Using Arrays," *Proc. IRE*, vol. 49, pp. 1066-1074, June, 1961. (see also "Correction to Communication Satellites Using Arrays," *Proc. IRE*, vol. 49, pp. 1340-41, Aug. 1961.)

[4] B. S. Hewitt, "The evolution of Radar Technology into Commercial Systems," *IEEE MTT-S Microw. Symp. Dig.*, 1994, pp. 1271-1274.

[5] K. M. K. H. Leong, R. Y. Miyamoto, T. Itoh, "Moving Forward in Retrodirective Antenna Arrays," *IEEE Potentials*, pp. 16-21, August/September 2003.

[6] E. M. Rutz-Philipp, E. Kramer, "An FM Modulator with Gain for a Space Array," *IEEE Trans. Microwave Theory and Techniques*, vol. MTT-11, pp. 420-426, September 1963.

[7] S. L. Karode, V. F. Fusco, "Frequency Offset Retrodirective Antenna Array", *El. Letters*, vol. 33, July 1997.

[8] R. C. Chernoff, "Large Active Retrodirective Arrays for Space Applications," *IEEE Trans. Antennas and Propagation*, vol. AP-27, pp. 489-496, March 1979.

The invention claimed is:

1. A method for transmitting signals from transmitters into areas surrounding these transmitters via a satellite, comprising the steps of providing a satellite having a retrodirective antenna array comprising an array of receiving antenna elements defining a pattern of positions of the receiving antenna elements, and an array of transmitting antenna elements defining a pattern of positions of the transmitting antenna elements, receiving, by the array of receiving antenna elements of the retrodirective antenna array, a plurality of first signals each having an uplink frequency and being transmitted from individual transmitters, processing the received first signals for obtaining transformed signals by:

A/D converting the received first signals from analog to digital signals at individual sampling times, performing a Fourier transformation on the digital signals from space domain into space spectral domain for each sampling time, performing a digital frequency conversion from an uplink frequency band to a downlink frequency band, digital phase shifting of the space spectral domain components according to the frequency difference between the uplink and downlink frequency bands by complex multiplication, performing an inverse Fourier transformation to phase-shifted space spectral domain components from the space spectral domain to space domain, center-symmetrical mirroring the pattern of the positions of the receiving antenna elements, and D/A converting the transformed signals, and applying the transformed signals to the transmitting antenna elements of the retrodirective antenna array in accordance with the center-symmetrical mirrored pattern of the positions of the transmitting antenna elements.

2. The method according to claim 1, wherein an interelement-spacing of the transmitting antenna elements and an interelement-spacing of the receiving antenna elements are scaled by a factor substantially corresponding to the ratio of the downlink frequency to the uplink frequency.

3. The method according to claim 1, wherein an interelement-spacing of the receiving antenna elements results in a first phase relation among the first signals received by the receiving antenna elements and an interelement-spacing of the transmitting antenna elements results in a second phase relation among the transformed signals to be transmitted from the transmitting antenna elements, and wherein the first phase relation is transformed into the second phase relation by performing a fast Fourier transform type of transformation to uncover individual components by (i) scaling an argument of the fast Fourier transform with an argument defined by a matrix of sample values of the received first signals at the same sampling time of the step of A/D converting the received first signals from analog to digital signals, and (ii) generating, based on the transformed signals, a wave to be transmitted from the scaled fast Fourier transform with a scaling factor depending on the ratio of the interelement-spacing of the receiving antenna elements to the interelement-spacing of the transmitting antenna elements.

4. The method according to claim 1, wherein the uplink frequency is modified in a pseudorandom manner for obtaining an uplink frequency hopping performed in the transmitters through standard hopping methods like time-varying local oscillation and defining a sequence of uplink frequencies, and wherein an uplink frequency dehopping is performed in the step of performing digital frequency conversion from the uplink frequency to the downlink frequency.

5. The method according to claim 4, wherein the sequence of uplink frequencies varies depending on the angle of incidence of the received first signals, wherein in a transmitter the sequence of uplink frequencies can be selected based on the geographical position of the transmitter, which corresponds to a certain angle of incidence, and wherein the uplink frequency dehopping is digitally realized depending on the angle of incidence.

6. The method according to claim 3, wherein the sequence of uplink frequencies varies depending on the angle of incidence of the received first signals, wherein in a transmitter the sequence of uplink frequencies can be selected based on the geographical position of the transmitter, which corresponds to a certain angle of incidence, and wherein the uplink frequency dehopping is digitally realized depending on the angle of incidence.

7. The method according to claim 1, wherein the array of receiving antenna elements and the array of transmitting antenna elements is realized by one single array of antenna elements capable of being operable as receiving antenna elements and transmitting antenna elements, respectively.

8. The method according to claim 1, wherein the method is used for distributing information from a number of transmitters towards areas surrounding each of them for one or more of:

broadcasting TV and/or radio programs, creating joint situation awareness in air-traffic management, distributing floating car data, and supporting disaster management, wherein the method is performed in parallel and independent from (i) the number of transmitters from which the retrodirective antenna array receives signals, and (ii) a particular configuration of the retrodirective antenna array.

9. The method according to claim 1, further comprising the step of filtering the received first signals with respect to at least one of uplink frequency and angle of incidence so as to allow transmitting of signals from the retrodirective antenna array depending on at least one of uplink frequency of the first signals and direction of arrival of the first signals.

* * * * *